US010621301B2

(12) United States Patent
Sha et al.

(10) Patent No.: US 10,621,301 B2
(45) Date of Patent: Apr. 14, 2020

(54) COORDINATES-BASED VARIATIONAL AUTOENCODER FOR GENERATING SYNTHETIC VIA LAYOUT PATTERNS

(71) Applicant: INTERNATIONAL BUSINESS MACHINES CORPORATION, Armonk, NY (US)

(72) Inventors: Jing Sha, White Plains, NY (US); Michael A. Guillorn, Cold Springs, NY (US); Derren N. Dunn, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 16/001,531

(22) Filed: Jun. 6, 2018

(65) Prior Publication Data
US 2019/0377848 A1    Dec. 12, 2019

(51) Int. Cl.
*G06F 17/50* (2006.01)
*G06N 3/08* (2006.01)

(52) U.S. Cl.
CPC ......... *G06F 17/5081* (2013.01); *G06N 3/08* (2013.01); *G06F 2217/02* (2013.01)

(58) Field of Classification Search
CPC .... G06F 17/5081; G06F 2217/02; G06N 3/08
See application file for complete search history.

(56) References Cited

U.S. PATENT DOCUMENTS

| 5,274,714 A | * | 12/1993 | Hutcheson | ......... | G06K 9/00221 |
| | | | | | 382/157 |
| 6,002,787 A | * | 12/1999 | Takhar | ............... | G06K 9/00067 |
| | | | | | 382/125 |
| 6,650,779 B2 | * | 11/2003 | Vachtesvanos | ...... | G01N 21/956 |
| | | | | | 348/88 |
| 9,690,898 B2 | | 6/2017 | Graur et al. | | |

(Continued)

FOREIGN PATENT DOCUMENTS

WO    2017123553 A1    7/2017

OTHER PUBLICATIONS

Hamouda et al., "Enhanced OPC Recipe Coverage and Early Hotspot Detection Through Automated Layout Generation and Analysis", Optical Microlithography XXX. vol. 10147. International Society for Optics and Photonics. Mar. 24, 2017. pp. 1-9.

(Continued)

*Primary Examiner* — Naum Levin
(74) *Attorney, Agent, or Firm* — Tutunjian & Bitetto, P.C.; Vazken Alexanian

(57) ABSTRACT

A method is presented for generating a plurality of physical design layout patterns. The method includes selecting one or more physical design layouts for neural network training, converting the plurality of physical design layout patterns into coordinate arrays, a coordinate array of the coordinate arrays including via center coordinates of vias in a physical design layout pattern of the plurality of physical design layout patterns, training, by employing the coordinate arrays, a variational autoencoder (VAE), and generating one (Continued)

or more new synthetic coordinate arrays by employing the trained VAE, a synthetic coordinate array of the one or more new synthetic coordinate arrays including via center coordinates of vias for a new physical design layout pattern.

20 Claims, 8 Drawing Sheets

(56) References Cited

U.S. PATENT DOCUMENTS

| | | | |
|---|---|---|---|
| 9,915,625 | B2 | 3/2018 | Gao et al. |
| 10,043,261 | B2* | 8/2018 | Bhaskar .................... G03F 1/86 |
| 10,133,933 | B1* | 11/2018 | Fisher ................ G06K 9/00718 |
| 2008/0077907 | A1 | 3/2008 | Kulkarni |
| 2017/0148226 | A1 | 5/2017 | Zhang et al. |
| 2017/0270408 | A1 | 9/2017 | Shi et al. |
| 2017/0351952 | A1 | 12/2017 | Zhang et al. |
| 2018/0046900 | A1* | 2/2018 | Dally ................... G06N 3/0427 |
| 2018/0293721 | A1* | 10/2018 | Gupta .................... G06N 20/00 |

OTHER PUBLICATIONS

Jeon et al, "Early Stage Hot spot Analysis through Standard cell base random pattern generation", Design-Process-Technology Co-optimization for Manufacturability XI. vol. 10148. International Society for Optics and Photonics. Apr. 4, 2017. pp. 1-7.

Johnson et al., "Composing graphical models with neural networks for structured representations and fast inference", Advances in neural information processing systems. Mar. 20, 2016. pp. 1-27.

Lutich et al., "PatterNet: a system to learn compact physical design pattern representations for pattern-based analytics", Journal of Micro/Nanolithography, MEMS, and MOEMS. vol. 16(3). Sep. 16, 2017. pp. 1-7.

Neogi et al., "Design Space Analysis of Novel Interconnect Constructs for 22NM FDX TM Technology", Design-Process-Technology Co-optimization for Manufacturability XI. vol. 10148. International Society for Optics and Photonics. Mar. 30, 2017. pp. 1-7.

* cited by examiner

COORDINATES-BASED VARIATIONAL AUTOENCODER FOR GENERATING SYNTHETIC VIA LAYOUT PATTERNS

BACKGROUND

Technical Field

The present invention relates generally to generation of physical design layout patterns of integrated chips and more specifically, to a coordinates-based variational autoencoder for generating synthetic via layout patterns.

Description of the Related Art

In a conventional integrated circuit design process, a circuit designer begins with a conceptual idea of what functions an integrated circuit is to perform. The circuit designer then creates a circuit design on a computer and verifies the circuit design by employing simulation tools to ensure that the circuit operates as desired. The design at this stage can be represented by a circuit schematic, but can also be represented by higher level abstractions within the computer. These abstract designs are then converted to physical definitions of the circuit elements to be fabricated. These definitions, often referred to as drawn designs of the circuit layout, represent the geometric boundaries for the physical devices to be fabricated.

SUMMARY

In accordance with an embodiment, a method is provided for generating a plurality of physical design layout patterns. The method includes selecting one or more physical design layouts for neural network training, converting the plurality of physical design layout patterns into coordinate arrays, a coordinate array of the coordinate arrays including via center coordinates of vias in a physical design layout pattern of the plurality of physical design layout patterns, training, by employing the coordinate arrays, a variational autoencoder (VAE), and generating one or more new synthetic coordinate arrays by employing the trained VAE, a synthetic coordinate array of the one or more new synthetic coordinate arrays including via center coordinates of vias for a new physical design layout pattern.

In accordance with an embodiment, a system is provided for generating a plurality of physical design layout patterns. The system includes one or more computer subsystems and one or more components executed by the one or more computer subsystems, wherein the one or more components comprise the machine learning based model configured for performing one or more simulations by: selecting one or more physical design layouts for neural network training, converting the plurality of physical design layout patterns into coordinate arrays, a coordinate array of the coordinate arrays including via center coordinates of vias in a physical design layout pattern of the plurality of physical design layout patterns, training, by employing the coordinate arrays, a variational autoencoder (VAE), and generating one or more new synthetic coordinate arrays by employing the trained VAE, a synthetic coordinate array of the one or more new synthetic coordinate arrays including via center coordinates of vias for a new physical design layout pattern.

In accordance with yet another embodiment, a non-transitory computer-readable storage medium comprising a computer-readable program for generating a plurality of physical design layout patterns is presented. The non-transitory computer-readable storage medium performs the steps of selecting one or more physical design layouts for neural network training, converting the plurality of physical design layout patterns into coordinate arrays, a coordinate array of the coordinate arrays including via center coordinates of vias in a physical design layout pattern of the plurality of physical design layout patterns, training, by employing the coordinate arrays, a variational autoencoder (VAE), and generating one or more new synthetic coordinate arrays by employing the trained VAE, a synthetic coordinate array of the one or more new synthetic coordinate arrays including via center coordinates of vias for a new physical design layout pattern.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

DETAILED DESCRIPTION

Electronic design automation (EDA) tools can be advantageously employed to optimize integrated circuit design. Embodiments in accordance with the present invention provide methods and devices for generating synthetic single-layer layout patterns by employing a variational autoencoder. The method of generating synthetic physical design layout patterns of vias is performed by employing a type of deep neural networks called variational autoencoders (VAEs) using coordinates (data format native to physical design layouts).

Embodiments in accordance with the present invention provide methods and devices for enabling automation and scaling of layout pattern generation of vias. The exemplary embodiments of the present invention introduce a conversion of physical design layouts to a data format based on coordinates of vias in the layouts as input for Variational Autoencoders (VAEs). The method in this invention can generate layout patterns that look like real layouts (training data, or samples for training), but not the same, for expanding pattern libraries. The invention enables automation: no need for human intervention after model training, scalability: trained model can generate new patterns instantly, cumulative learning: model becomes more versatile with more diverse training data (layout patterns), and ease of data processing: coordinates-based VAEs can generate layout patterns with less and/or easier post-processing than image-based neural networks including VAEs.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
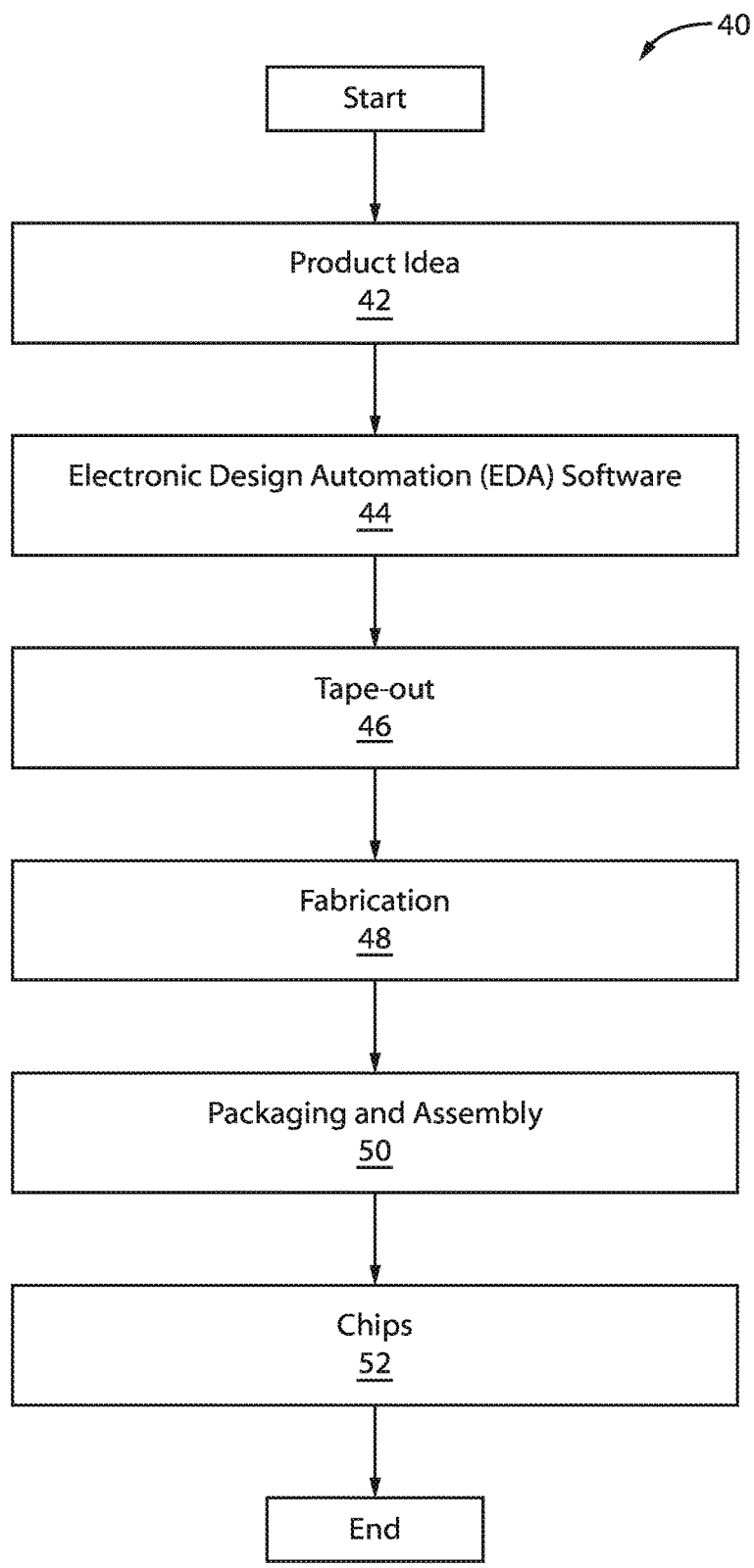
FIG. 1 is an exemplary block/flow diagram illustrating a simplified representation of an exemplary digital integrated circuit (IC) flow, in accordance with an embodiment of the present invention.

FIG. 1 is a block/flow diagram illustrating a simplified representation of an exemplary digital integrated circuit (IC) flow, in accordance with an embodiment of the present invention.

At a high level, the process 40 starts with the product idea 42 and is realized in an electronic design automation (EDA) software design process 44. When the design is finalized, it can be taped-out 46. After tape out, the fabrication process 48 and packaging and assembly processes 50 occur resulting, ultimately, in finished chips 52.

Figure 2:
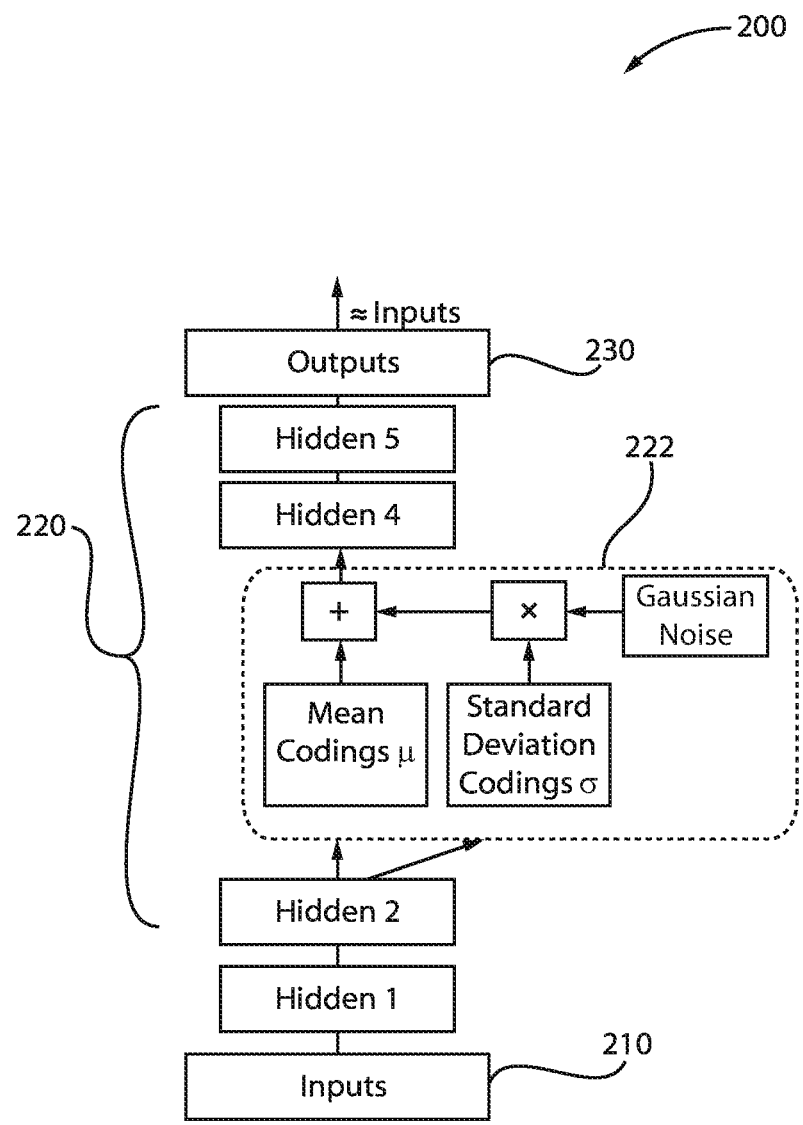
FIG. 2 is a block/flow diagram illustrating an exemplary variational autoencoder (VAE)

FIG. 2 is a block/flow diagram illustrating a neural network based variational autoencoder.

The variational autoencoder (VAE) 200 includes a plurality of inputs 210 that are fed through a plurality of hidden layers 220 and then output as a plurality outputs 230. The plurality of hidden layers can also include a sampling layer 222. A variational autoencoder (VAE) provides a probabilistic manner for describing an observation in latent space. Thus, rather than building an encoder which outputs a single value to describe each latent state attribute, the encoder is formulated to describe a probability distribution for each latent attribute.

Therefore, variational autoencoders (VAEs) are probabilistic, meaning that their outputs are partially determined by chance, even after training, and generative, meaning that VAEs generate new instances that look like they were sampled from the training set. Concerning VAE architecture, VAEs include an encoder that produces mean codings $\mu$ and standard deviation codings $\sigma$, rather than deterministic codings. The actual codings are then sampled randomly from a Gaussian distribution with mean $\mu$ and standard deviation $\sigma$. The VAEs also include a decoder that takes the actual codings and decodes them normally to match outputs to inputs. Thus, the encoder (or recognition network) converts the inputs to an internal representation (codings) and the decoder (or generative network) converts the internal representation (codings) to the outputs.

Figure 3:
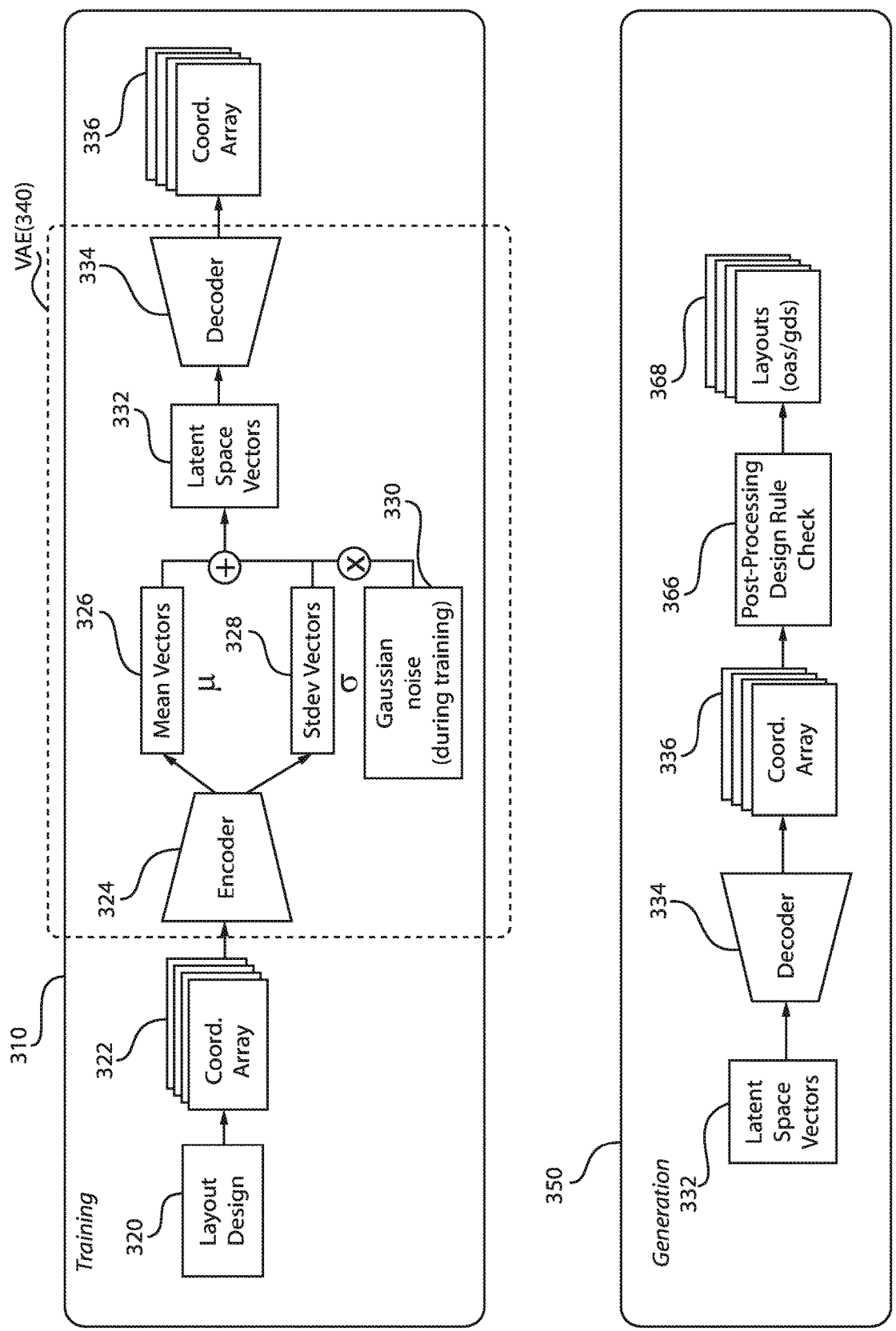
FIG. 3 is a block/flow diagram illustrating a pipeline for training a VAE and employing the trained VAE to generate synthetic patterns, in accordance with an embodiment of the present invention.

FIG. 3 is a block/flow diagram illustrating a pipeline for generating synthetic patterns with a neural network based variational autoencoder, in accordance with an embodiment of the present invention.

In producing a very-large-scale integration (VLSI) integrated circuit (IC), usually the circuits of the IC are designed for functionality and then put through a layout process. The layout process produces a drawn layout of the IC. The IC of question can, for instance, be a whole computer processor, or can be only a portion of such. It may be a whole, or part, of a communication IC, or any other kind of IC, or part of an IC. Usually such a drawn layout is in digital form, which can be stored by digital media (e.g., storage devices). The term "drawn layout" can be used interchangeably with the term "layout."

The layout includes the various layers that will make up the IC during fabrication. The number of such layers for state of the art complicated ICs can run between 50 to 100, but with technology progress layers can run into the hundreds. Each layer in the layout is essentially a collection of shapes. Such shapes can be rectangles, or more generally polygons, or circles, or practically any geometric form, or even irregular forms. The boundary, or perimeter, or edge, of a shape is the contour of the shape.

When the IC is manufactured, the various layers of the drawn layout go through processing. Such processing is characterized by parameters. The layers to be processed can be, for instance, a polysilicon layer, a first wiring layer, a contact via layer, or any other known in the art. Parameters characterizing the processing can be, for instance, focal point during a lithographic illumination, duration of illumination, thickness of a masking layer, or any other known in the art. Given a drawn layout, the processing for any chosen parameter set can be simulated.

In view thereof, the exemplary embodiments of the present invention present a training model 310 and a generation model 350.

The training model 310 includes a layout design 320 that is converted to coordinate arrays 322. The coordinate arrays 322 are fed into an encoder 324. The encoder 324 produces mean codings 326 and standard deviation codings 328. Then the actual codings are sampled randomly from a Gaussian distribution 330 with the mean codings 326 and the standard deviation codings 328 to create latent space vectors 332. The latent space vectors 332 are sent to a decoder 334 that generates coordinate arrays 336. The variational autoencoder 340 can include the encoder 324, the decoder 334, and all other components therebetween.

The generation model 350 includes the latent space vectors 332 fed to the decoder 334 to generate the coordinate arrays 336, which are then fed to the post-processing design rule check module 366 to generate synthetic layout patterns 368. After training, the decoder is employed as a standalone model during inference to generate new synthetic layout patterns. Moreover, it is noted that hyperparameters (such as number of neural network layers, number of neurons for each neural network layer, etc.) for VAEs can vary case by case (based on input polygon coordinates of layouts, training accuracy target, computing hardware, etc.).

Therefore, the exemplary embodiments of the present invention disclose how to represent layout patterns in the form of polygon coordinate arrays rather than images, and use the coordinates arrays for training and employing generative models (e.g., decoder of a variational autoencoder). Stated differently, polygon coordinates from layout patterns are taken as input and data for generative models are output. Also, the exemplary embodiments of the present invention use layout pattern coordinates as both input and output for generating new synthetic layout patterns.

Figure 4:
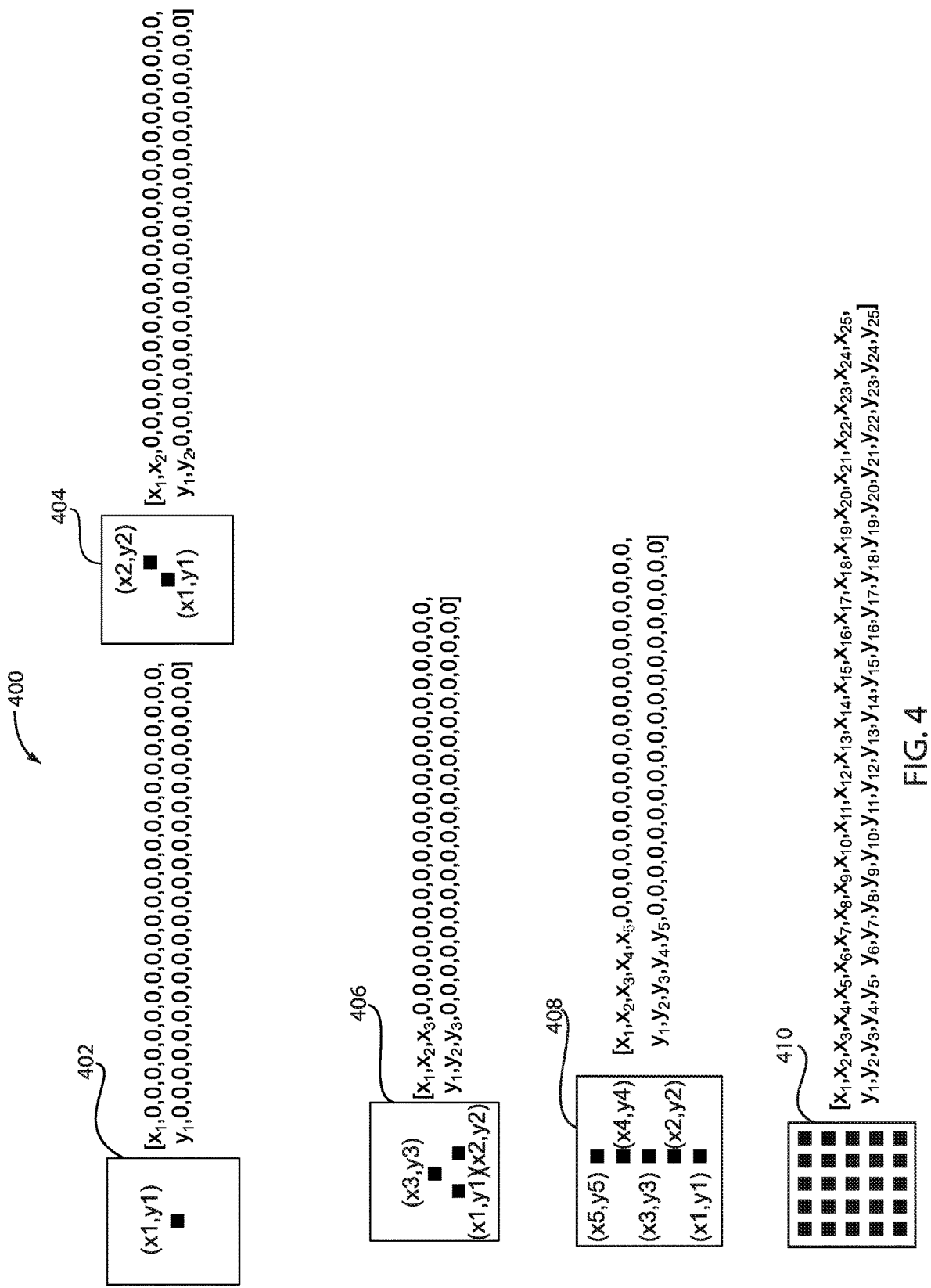
FIG. 4 is a block/flow diagram illustrating data preparation for layout to coordinate arrays, in accordance with an embodiment of the present invention.

FIG. 4 is a block/flow diagram 400 illustrating data preparation for layout to coordinate arrays, in accordance with an embodiment of the present invention.

Designations 402-410 depict data preparation for converting a via layout pattern to a coordinate array. In the examples of 402-410, it is assumed that the field of view (FOV) has a maximum of 25 possible vias (e.g., where N is 25). Thus, each coordinate array is a coordinate vector of length 50 (2*25), or a coordinate matrix of size 2×25 or 25×2. Layout 402 includes a single via having via center coordinates (x1, y1). The layout 402 is converted to a coordinate array shown adjacent to the layout 402. For example, the coordinate array is of size 2*25, where the first row of 25 entries are reserved for the x-coordinates of via centers and the second row of 25 entries are reserved for the y-coordinates of the via centers. It should be appreciated that for smaller or larger values of N representing the maximum possible vias in the FOV, the number of entries reserved for the x- and y-coordinates of the via centers is varied accordingly. Since the layout 402 has only a single via, the coordinate array is padded with null or 0 values outside the range of possible via coordinates for the remaining entries, or all entries except for the first positions x1 and y1.

Layout 404 includes two vias and a corresponding coordinate array with values for x1, x2, y1, y2 and the rest of the entries padded with zero. 406-410 show additional layouts, and corresponding coordinate arrays. The layouts 406, 408 include three and five vias, respectively, with appropriate padding in the coordinate arrays. The layout 410 represents one with the maximum number of vias, such that there is no padding required in the coordinate array adjacent thereto.

Figure 5:
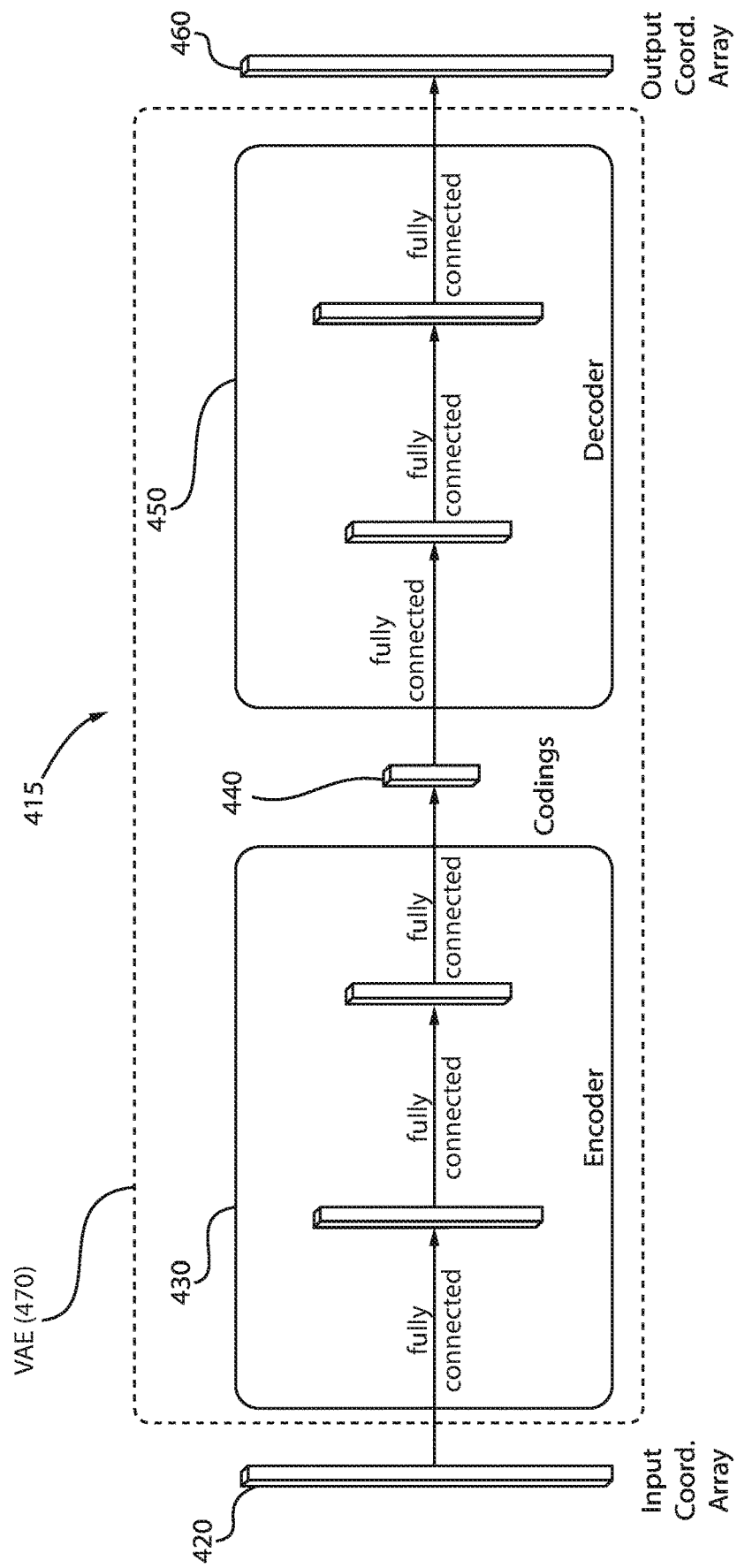
FIG. 5 is a block/flow diagram illustrating a variational autoencoder architecture for fully connected neural networks, in accordance with an embodiment of the present invention.

FIG. 5 is a block/flow diagram illustrating a variational autoencoder architecture 415 for fully connected neural networks, in accordance with an embodiment of the present invention.

The coordinate arrays are input by an input unit 420 into an encoder 430 including a plurality of fully connected layers. The encoder 430 produces mean codings and standard deviation codings 440. Then the actual codings are sampled randomly from a Gaussian distribution with the mean codings and the standard deviation codings 440 to create latent space vectors fed to decoder 450. The decoder 450 outputs synthetic via layout patterns to an output unit 460. The variational autoencoder (VAE) 470 can include the encoder 430, the decoder 450, and all other components therebetween. It is noted that the hyperparameters of the neural network are fine-tuned based on the simulated values determined for via layout patterns.

Consequently, the synthetic coordinate arrays produced during inference are provided for post-processing, such as design rule check (DRC). The design rule check can ensure that the synthetic coordinate arrays produced by the trained VAE meet specified design rules for layout patterns in a particular use case that may not be captured during training.

In some embodiments, via sizes are assumed to be fixed (e.g., known width and height), and thus the design rule check includes determining whether the center coordinates of the vias in the synthetic coordinate arrays violate any design rules. For example, this can include checking whether the absolute distance between the x- or y-coordinates of two vias exceeds some designated threshold, or that abs(x1−x2)>xthreshold or abs (y1−y2)>ythreshold.

Additionally, the synthetic via layout patterns can be displayed on a user interface (FIG. 7), such as a display monitor. The user interface can show the inputs 420 received, as well as the outputs 460 generated by employing a model for generating synthetic single-layer layout patterns by using a variational autoencoder. Visual representations of the simulated values for the vias can be displayed on one or more user interfaces for analysis.

Figure 6:
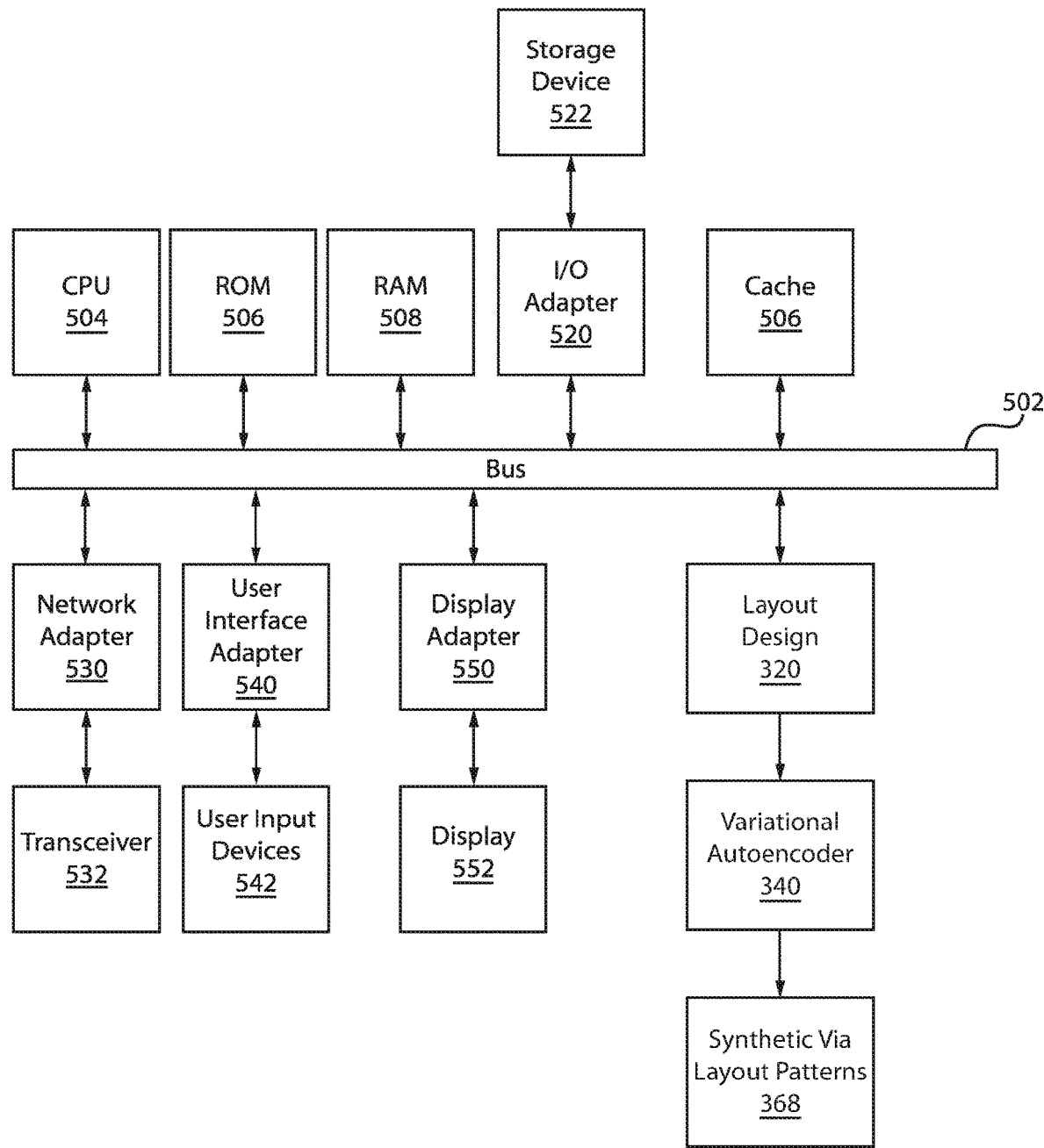
FIG. 6 is an exemplary processing system for generating synthetic single-layer layout patterns by employing a variational autoencoder (VAE), in accordance with embodiments of the present invention.

FIG. 6 is an exemplary processing system for generating synthetic single-layer layout patterns by employing a variational autoencoder (VAE), in accordance with embodiments of the present invention.

The processing system includes at least one processor (CPU) 504 operatively coupled to other components via a system bus 502. A cache 506, a Read Only Memory (ROM) 508, a Random Access Memory (RAM) 510, an input/output (I/O) adapter 520, a network adapter 530, a user interface adapter 540, and a display adapter 550, are operatively coupled to the system bus 502. Additionally, layout designs 320 can be provided to a variational autoencoder 340 to generate synthetic via layout patterns 368.

A storage device 522 is operatively coupled to system bus 502 by the I/O adapter 520. The storage device 522 can be any of a disk storage device (e.g., a magnetic or optical disk storage device), a solid state magnetic device, and so forth.

A transceiver 532 is operatively coupled to system bus 502 by network adapter 530.

User input devices 542 are operatively coupled to system bus 502 by user interface adapter 540. The user input devices 542 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 542 can be the same type of user input device or different types of user input devices. The user input devices 542 are used to input and output information to and from the processing system.

A display device 552 is operatively coupled to system bus 502 by display adapter 550.

Of course, the processing system can also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
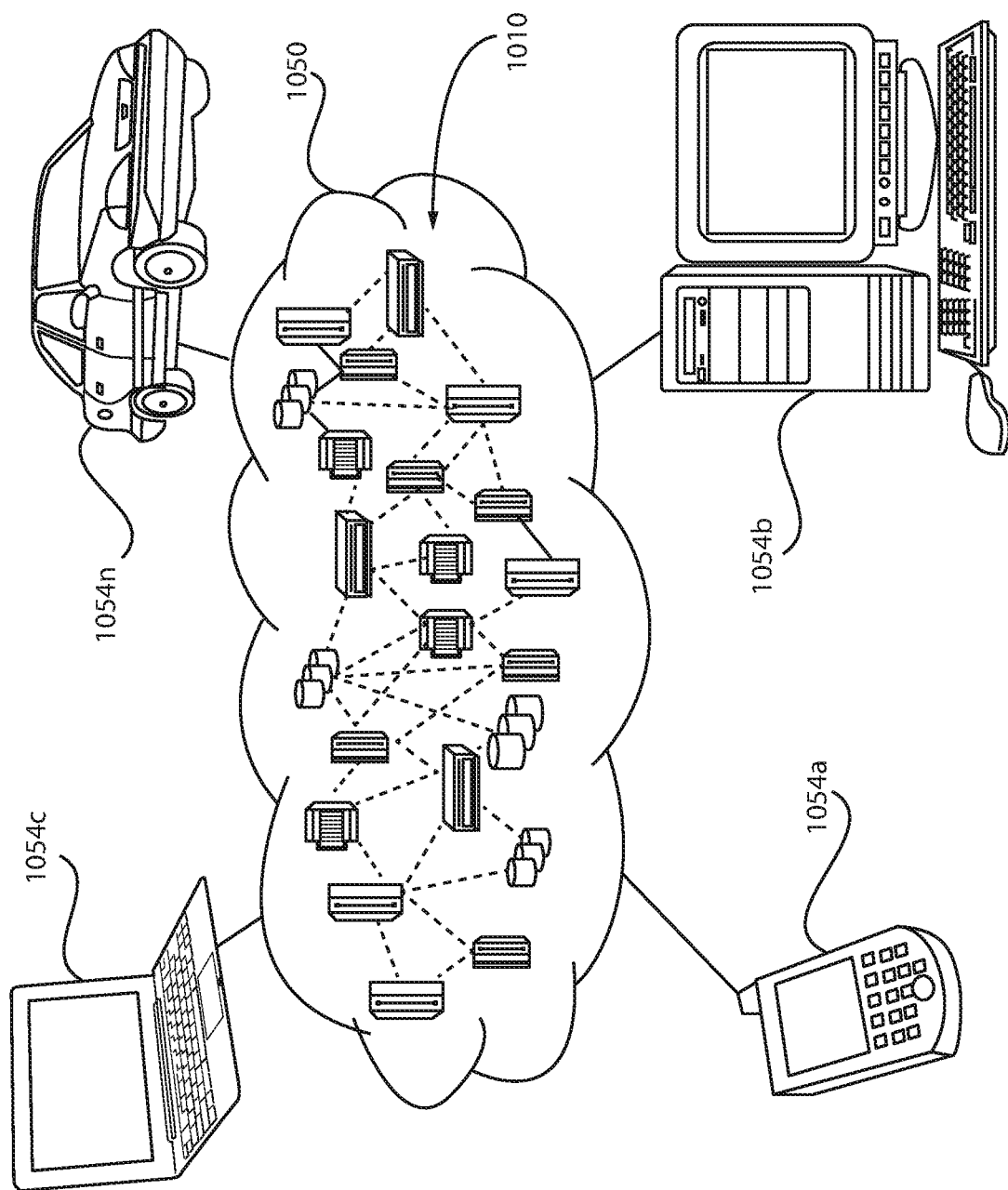
FIG. 7 is a block/flow diagram of an exemplary cloud computing environment, in accordance with an embodiment of the present invention.

FIG. 7 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 1050 is depicted for enabling use cases of the present invention. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N can communicate. Nodes 1010 can communicate with one another. They can be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 7 are intended to be illustrative only and that computing nodes 1010 and cloud computing environment 1050 can communicate with any type of computerized device over any type of network and/or network addressable connection (e.g., using a web browser).

Figure 8:
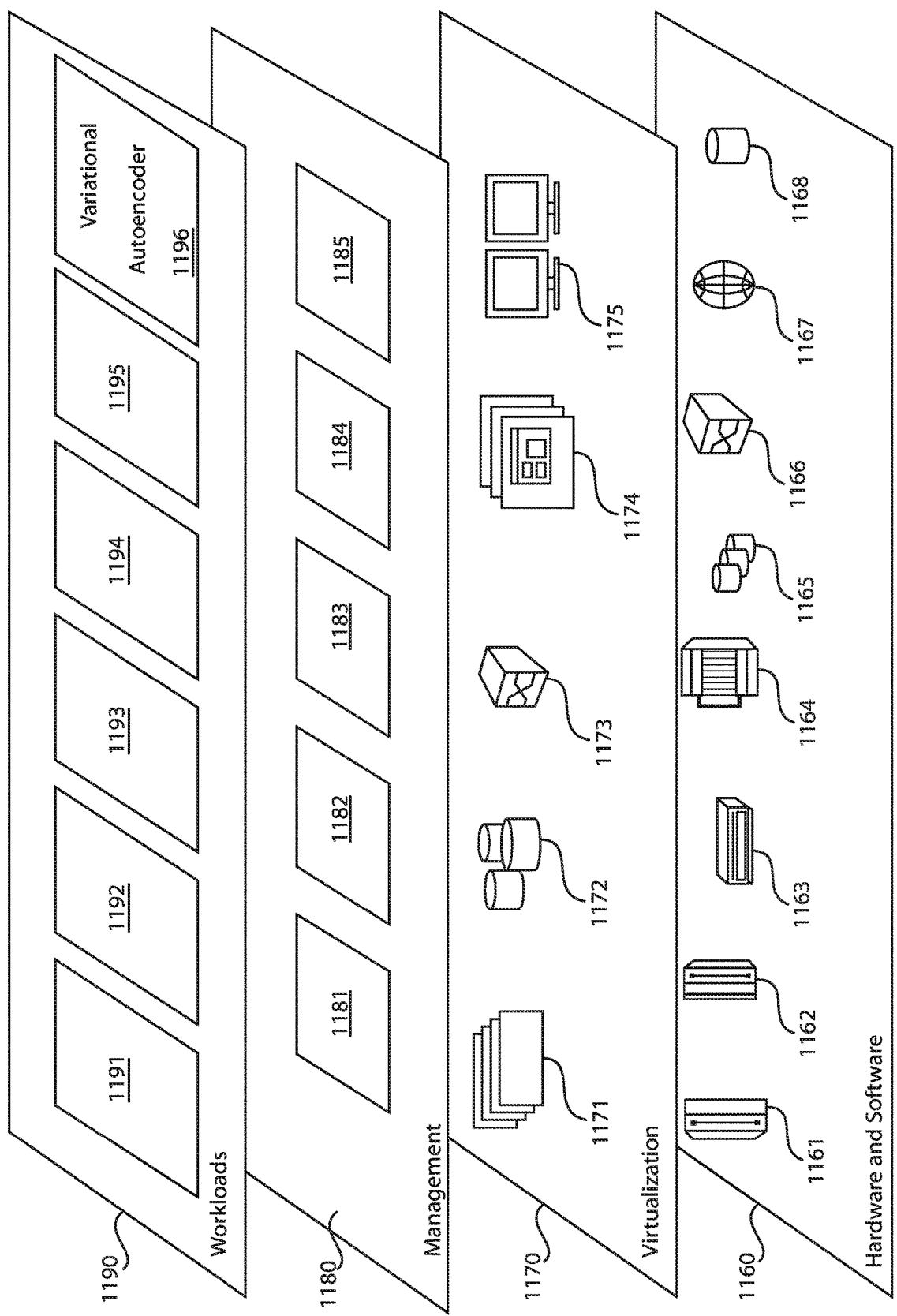
FIG. 8 is a schematic diagram of exemplary abstraction model layers, in accordance with an embodiment of the present invention.

FIG. 8 is a schematic diagram of exemplary abstraction model layers, in accordance with an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities can be provided: virtual servers 1171; virtual storage 1172; virtual networks 1173, including virtual private networks; virtual applications and operating systems 1174; and virtual clients 1175.

In one example, management layer 1180 can provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment can be utilized. Examples of workloads and functions which can be provided from this layer include: mapping and navigation 1191; software development and lifecycle management 1192; virtual classroom education delivery 1193; data analytics processing 1194; transaction processing 1195; and a variational autoencoder 1196.

Still yet, any of the components of the present invention could be created, integrated, hosted, maintained, deployed, managed, serviced, etc. by a service supplier who offers to provide a method for generating synthetic single-layer layout patterns by employing a variational autoencoder. Thus, the present invention describes a process for deploying, creating, integrating, hosting, maintaining, and/or integrating computing infrastructure, including integrating computer-readable code into the distributed network, wherein the code is capable of performing a method for generating synthetic single-layer layout patterns by employing a variational autoencoder. In another embodiment, the invention provides a business method that performs the process blocks/steps of the invention on a subscription, advertising, and/or fee basis. That is, a service supplier, such as a Solution Integrator, could offer to provide a method for generating synthetic single-layer layout patterns by employing a variational autoencoder. In this case, the service supplier can create, maintain, support, etc. a computer infrastructure that performs the process blocks/steps of the invention for one or more customers. In return, the service supplier can receive payment from the customer(s) under a subscription and/or fee agreement and/or the service supplier can receive payment from the sale of advertising content to one or more third parties.

The methods described herein can be at least partially processor-implemented. For example, at least some of the operations of a method can be performed by one or processors or processor-implemented hardware modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the one or more embodiments, the practical application or technical improvement over technologies found in the marketplace, or to enable others of ordinary skills in the art to understand the embodiments described herein.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for generating synthetic single-layer layout patterns by employing a variational autoencoder (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for generating a plurality of physical design layout patterns, the method comprising:
    selecting one or more physical design layouts for neural network training;
    converting the plurality of physical design layout patterns into coordinate arrays, a coordinate array of the coordinate arrays including via center coordinates of vias in a physical design layout pattern of the plurality of physical design layout patterns;
    training, by employing the coordinate arrays, a variational autoencoder (VAE); and
    generating one or more new synthetic coordinate arrays by employing the trained VAE, a synthetic coordinate array of the one or more new synthetic coordinate arrays including via center coordinates of vias for a new physical design layout pattern.

2. The method of claim 1, wherein the coordinate array has a size of M*N, where M is a number of values for representing center coordinates of respective ones of features in a designated coordinate system and N is a maximum number of vias in a field of view of the physical design layout pattern represented by the physical design layout pattern.

3. The method of claim 2, wherein, when the field of view includes fewer than N vias, the coordinate array is padded with null values outside a range of possible coordinates for the field of view of the physical design layout pattern.

4. The method of claim 1, wherein the vias of the one or more new synthetic coordinate arrays include fixed-size rectangular features.

5. The method of claim 4, wherein the coordinate array includes designated entries for coordinates of respective ones of the centers of the fixed-size rectangular features.

6. The method of claim 5, wherein the coordinates of the centers of the fixed-size rectangular features include coordinates in a Cartesian coordinate system, wherein a first designated set of entries of the coordinate array provide x-coordinates of the centers of the fixed-size rectangular features, and wherein a second designated set of entries of the coordinate array provide y-coordinates of the centers of the fixed-size rectangular features.

7. The method of claim 1, further comprising applying post-processing to the generated synthetic coordinate arrays using a design rule check.

8. The method of claim 1, further comprising converting the generated synthetic coordinate arrays to a format used in an electronic design automation (EDA) software.

9. The method of claim 1, further comprising utilizing the synthetic coordinate array to evaluate manufacturability of the new physical design layout pattern.

10. The method of claim 1, further comprising displaying a visual representation of the generated synthetic coordinate arrays on a user interface.

11. A non-transitory computer-readable storage medium comprising a computer-readable program for generating a plurality of physical design layout patterns, wherein the computer-readable program when executed on a computer causes the computer to perform the steps of:
selecting one or more physical design layouts for neural network training;
converting the plurality of physical design layout patterns into coordinate arrays, a coordinate array of the coordinate arrays including via center coordinates of vias in a physical design layout pattern of the plurality of physical design layout patterns;
training, by employing the coordinate arrays, a variational autoencoder (VAE); and
generating one or more new synthetic coordinate arrays by employing the trained VAE, a synthetic coordinate array of the one or more new synthetic coordinate arrays including via center coordinates of vias for a new physical design layout pattern.

12. The non-transitory computer-readable storage medium of claim 11, wherein the coordinate array has a size of M*N, where M is a number of values for representing center coordinates of respective ones of features in a designated coordinate system and N is a maximum number of vias in a field of view of the physical design layout pattern represented by the physical design layout pattern.

13. The non-transitory computer-readable storage medium of claim 12, wherein, when the field of view includes fewer than N vias, the coordinate array is padded with null values outside a range of possible coordinates for the field of view of the physical design layout pattern.

14. The non-transitory computer-readable storage medium of claim 11, wherein the vias of the one or more new synthetic coordinate arrays include fixed-size rectangular features.

15. The non-transitory computer-readable storage medium of claim 14, wherein the coordinate array includes designated entries for coordinates of respective ones of the centers of the fixed-size rectangular features.

16. The non-transitory computer-readable storage medium of claim 15, wherein the coordinates of the centers of the fixed-size rectangular features include coordinates in a Cartesian coordinate system, wherein a first designated set of entries of the coordinate array provide x-coordinates of the centers of the fixed-size rectangular features, and wherein a second designated set of entries of the coordinate array provide y-coordinates of the centers of the fixed-size rectangular features.

17. The non-transitory computer-readable storage medium of claim 11, wherein post-processing is applied to the generated synthetic coordinate arrays using a design rule check.

18. The non-transitory computer-readable storage medium of claim 11, wherein the generated synthetic coordinate arrays are converted to a format used in an electronic design automation (EDA) software.

19. A system configured to train a machine learning based model, the system comprising:
one or more computer subsystems; and
one or more components executed by the one or more computer subsystems, wherein the one or more components include the machine learning based model configured for generating a plurality of physical design layout patterns by:
selecting one or more physical design layouts for neural network training;
converting the plurality of physical design layout patterns into coordinate arrays, a coordinate array of the coordinate arrays including via center coordinates of vias in a physical design layout pattern of the plurality of physical design layout patterns;
training, by employing the coordinate arrays, a variational autoencoder (VAE); and
generating one or more new synthetic coordinate arrays by employing the trained VAE, a synthetic coordinate array of the one or more new synthetic coordinate arrays including via center coordinates of vias for a new physical design layout pattern.

20. The system of claim 19,
wherein the coordinate array has a size of M*N, where M is a number of values for representing center coordinates of respective ones of features in a designated coordinate system and N is a maximum number of vias in a field of view of the physical design layout pattern represented by the physical design layout pattern; and
wherein, when the field of view includes fewer than N vias, the coordinate array is padded with null values outside a range of possible coordinates for the field of view of the physical design layout pattern.

* * * * *